United States Patent
Rasmussen

(10) Patent No.: US 10,286,828 B1
(45) Date of Patent: May 14, 2019

(54) NO-TILT DUMP BOX

(71) Applicant: Altec Industries, Inc., Birmingham, AL (US)

(72) Inventor: Corey Rasmussen, Durham, NC (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/037,579

(22) Filed: Jul. 17, 2018

(51) Int. Cl.
*B60P 1/00* (2006.01)
*B60P 1/58* (2006.01)
*B60P 1/42* (2006.01)
*B60P 1/38* (2006.01)

(52) U.S. Cl.
CPC ...... *B60P 1/00* (2013.01); *B60P 1/38* (2013.01); *B60P 1/42* (2013.01); *B60P 1/58* (2013.01)

(58) Field of Classification Search
CPC ...... B60P 1/00; B60P 1/38; B60P 1/58; B60P 1/42; B60P 1/40; B60P 1/46; B60P 1/36; B60P 3/00
See application file for complete search history.

(56) References Cited

U.S. PATENT DOCUMENTS

| | | | | |
|---|---|---|---|---|
| 3,866,769 A | * | 2/1975 | Morey | B60P 3/00 406/44 |
| 4,212,574 A | * | 7/1980 | Dreier | A01D 90/105 180/286 |
| 5,033,932 A | * | 7/1991 | Compton | A01D 33/10 171/14 |
| 6,598,629 B2 | * | 7/2003 | Malone | B60P 1/38 141/231 |
| 9,061,287 B1 | * | 6/2015 | McDermott | A01G 23/093 |
| 9,961,877 B1 | * | 5/2018 | Aulick | A01K 5/002 |
| 2004/0069544 A1 | * | 4/2004 | Brauer | A01D 90/14 180/53.4 |
| 2017/0361751 A1 | * | 12/2017 | Quinn | B60P 1/003 |

* cited by examiner

*Primary Examiner* — Kaitlin S Joerger
(74) *Attorney, Agent, or Firm* — Erise IP, P.A.

(57) ABSTRACT

A dump box configured for mounting on a vehicle and providing a method of extracting chips from the dump box without tilting the dump box is presented. The dump box may receive chips through a first opening on a side and utilize an auger mounted near the floor and in a channel to move the chips through a second opening to the exterior of the dump box.

20 Claims, 8 Drawing Sheets

SECTION B-B

NO-TILT DUMP BOX

BACKGROUND

1. Field

Figure 1:
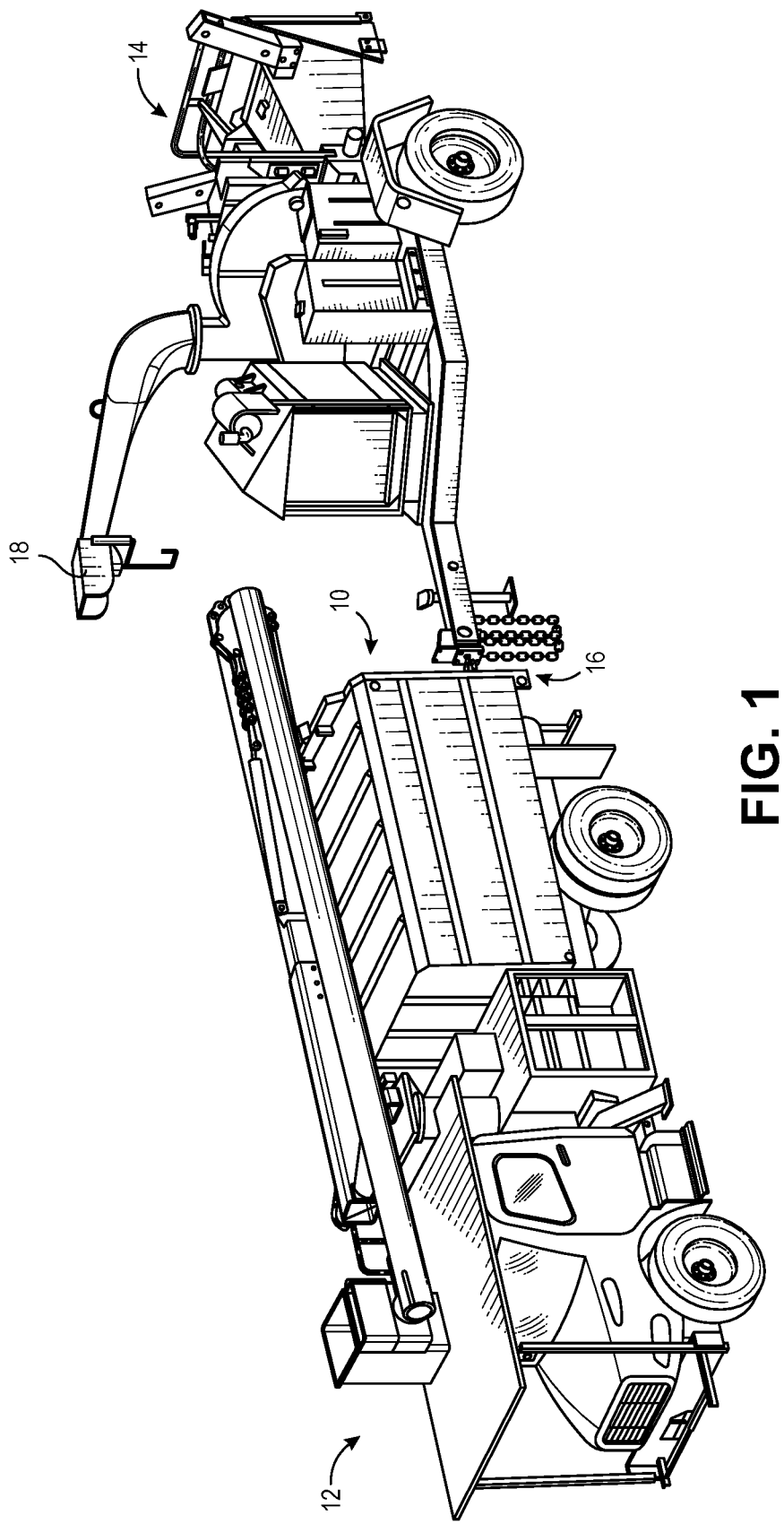

Embodiments of the invention relate to chippers and dump boxes for chipping wood, brush, and other fibrous material. More particularly, embodiments of the invention relate to a no-tilt dump box that catches chips from a chipper and expels the chips in an organized way.

2. Related Art

Typical chippers grind material such as wood into small pieces or chips and expel the material into a dump box. The dump box fills with the material and needs to be dumped to continue grinding the material. Dumping the dump box typically results in wasted time and causes the chipper operator to climb on the equipment. A chipper operator, on typical chippers, must disconnect the chipper from the box, climb up the vehicle and unstrap a boom that expels the chips into the box, lift the boom out of the way of the box, climb down the vehicle, tilt the box, dumping a portion of the chips, and move the vehicle forward to allow more chips to be dumped. Once all the chips have been dumped, the chipper operator may then climb back up the vehicle to lower the boom back into place and reconnect the chipper to the vehicle. In order to remove all chips from the dump box, this process may be performed by the operator two or three times increasing the likelihood of injury as well as increasing wasted time. Additionally, typical chippers will only operate the dump box while the outriggers are deployed. In order to move the vehicle forward to dump the chips the outriggers must be deployed, dump chips, retracted, move the vehicle forward, deploy outriggers, dump chips, and retract outriggers. This process takes time and many chipper operators bypass the process by partially deploying the outriggers tricking the system into allowing operation. The chipper operator may move the vehicle and tilting the dump box to dump the chips with the outriggers only partially deployed.

What is needed to overcome the problems described above is a no-tilt dump box that may expel the chips without the need to tilt the dump box thus allowing the vehicle to move without the outriggers and increase safety by allowing the operator to stay on the ground without climbing the vehicle. The no-tilt dump box may also save time by reducing the burden on the chipper operator. Embodiments of the invention may allow the dump box to spread chips over a larger area or fill containers that may be removed and replaced thus allowing the vehicle, chipper, and dump box, to remain in a single location. This cuts down on time and possible injury associated with moving the vehicle, chipper, and dump box.

SUMMARY

Embodiments of the invention solve the above-mentioned problems by utilizing a rotating auger to move chips from an interior of the dump box through an opening to an exterior of the dump box, thus negating the need to tilt the dump box for the removal of the chips.

In a first embodiment, the invention includes a dump box configured to expel chips from an interior of the dump box to an exterior of the dump box, the dump box comprising a plurality of sides and a floor defining the interior of the dump box, wherein at least a portion of the floor is non-level so as to present a low point, a first opening disposed in the plurality of sides configured for receiving the chips therein, a second opening disposed in the plurality of sides configured for expelling the chips therefrom, and an actuator disposed at the low point of the floor, wherein the actuator expels the chips from the interior of the dump box through the second opening to the exterior of the dump box, wherein the actuator is at least partially disposed within a channel.

In a second embodiment, the invention includes a dump box configured to be secured to a vehicle and move chips from an interior of the dump box to an exterior of the dump box, the dump box comprising a plurality of sides and a floor defining the interior of the dump box, wherein at least a portion of the floor is non-level so as to present a low point, wherein at least one of the plurality of sides or the floor is secured to the vehicle, a first opening disposed in the plurality of sides configured for receiving the chips therein, a second opening disposed in the plurality of sides configured for expelling the chips therefrom, and an actuator disposed at the low point of the floor, wherein the actuator expels the chips from the interior of the dump box through the second opening to the exterior of the dump box.

In a third embodiment the invention includes a dump box configured to move chips from an interior of the dump box to an exterior of the dump box, the dump box comprising, a plurality of sides and a floor defining the interior of the dump box, wherein at least a portion of the floor is non-level so as to present a low point, a first opening disposed in the plurality of sides configured for receiving the chips therein, a second opening disposed in the plurality of sides configured for expelling the chips therefrom, and an auger disposed at the low point of the floor, wherein the auger expels the chips from the interior of the dump box through the second opening to the exterior of the dump box.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Figure 2:
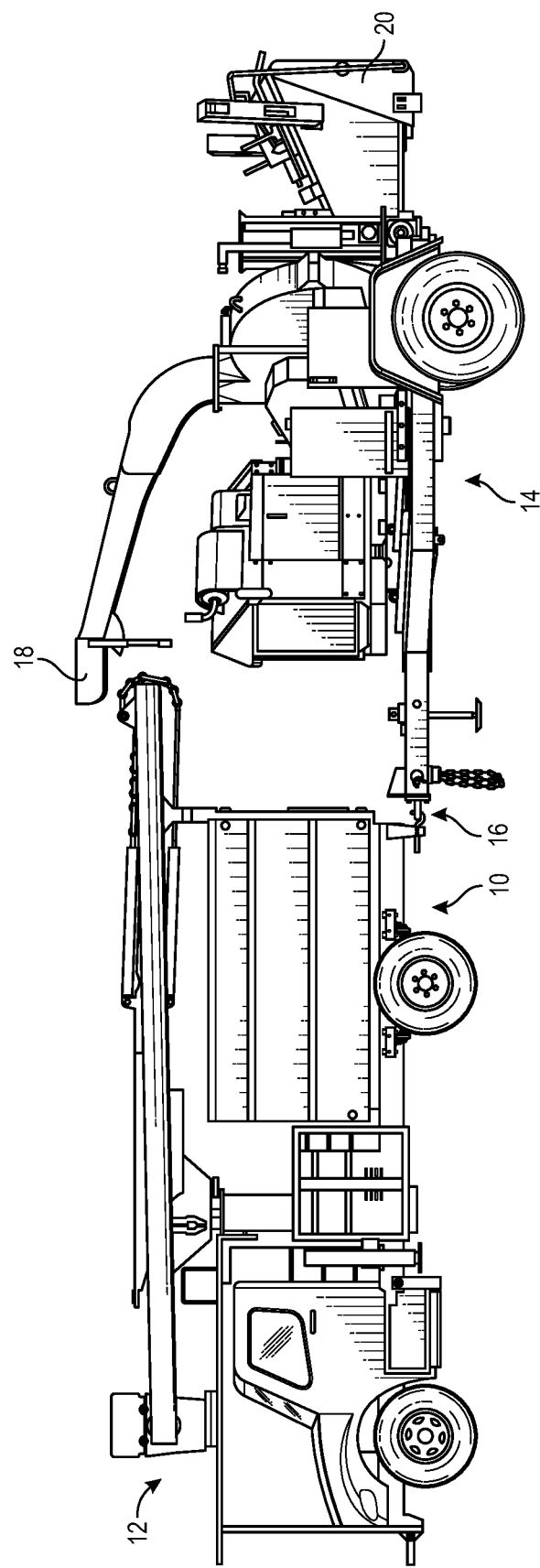
Figure 3:
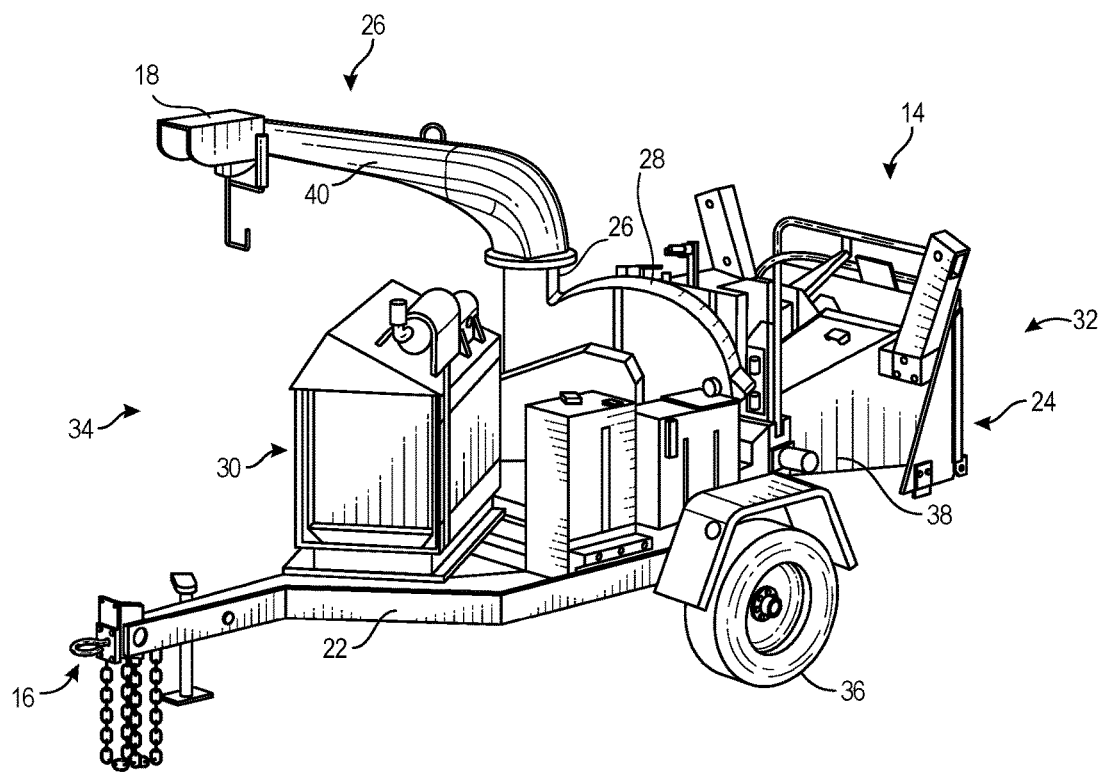
Figure 4:
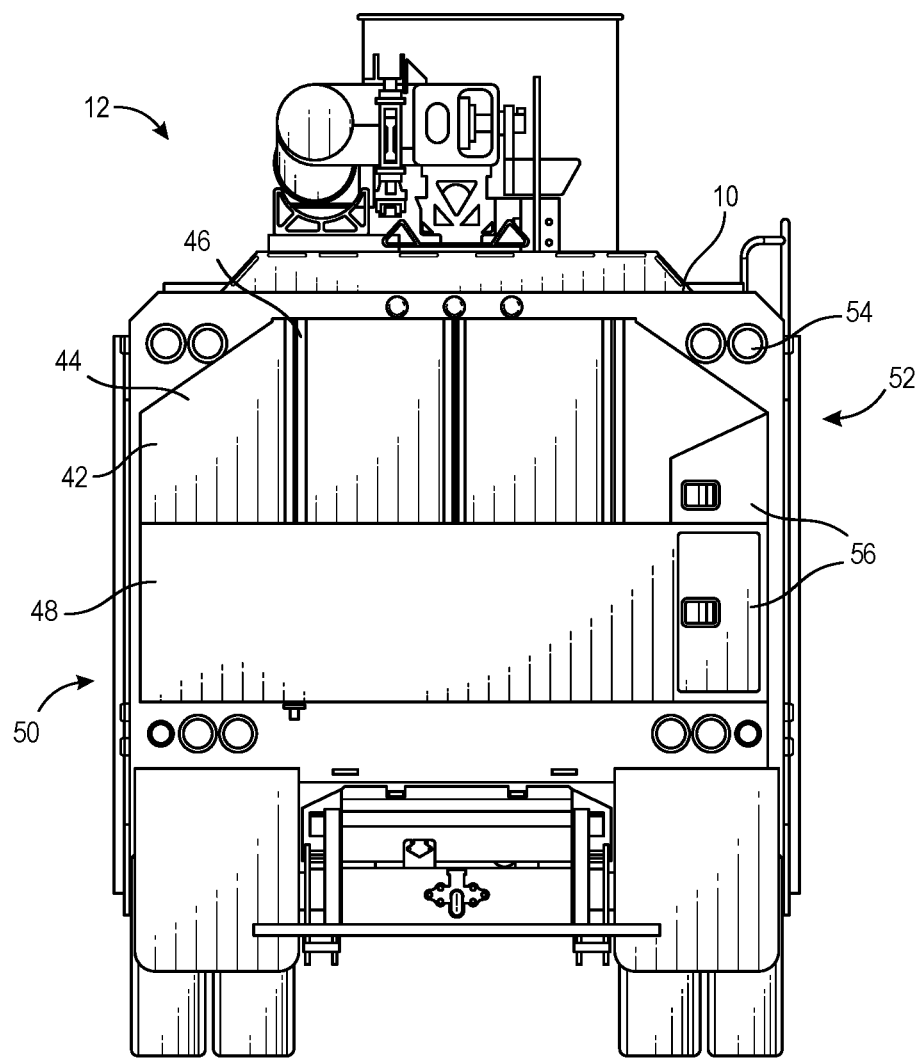
Figure 5A:
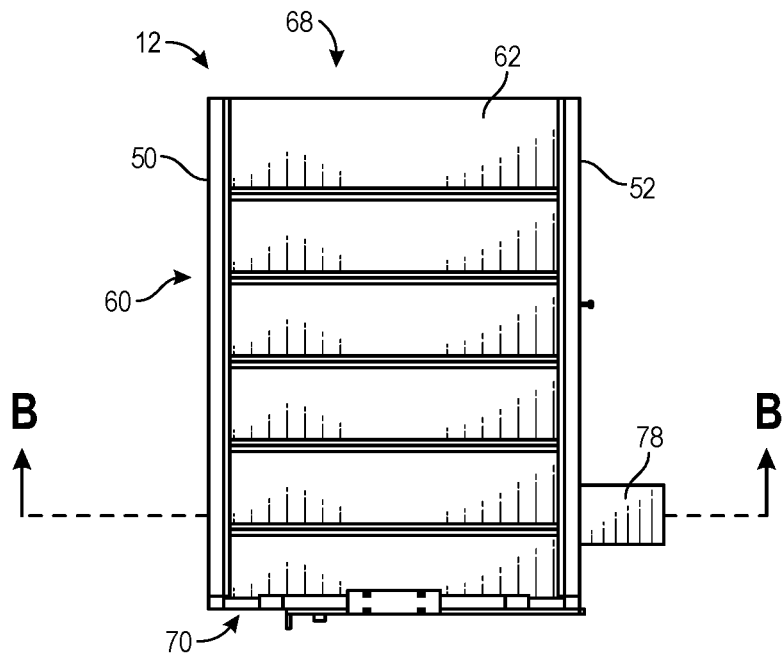
Figure 5B:
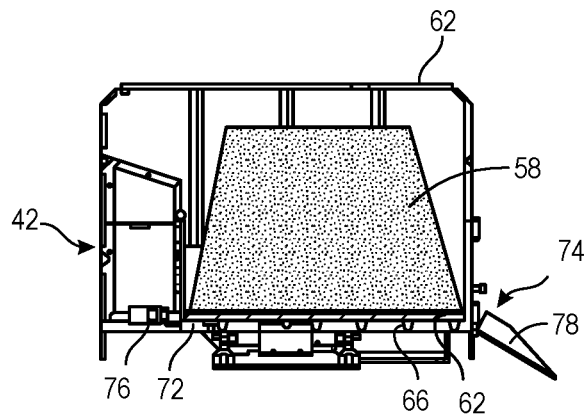

Embodiments of the current invention are described in detail below with reference to the attached drawing figures, wherein:

FIG. 1 presents a perspective view of a vehicle, a chipper, and a dump box depicting some embodiments of the invention;

FIG. 2 depicts a side view of the vehicle, the chipper, and the dump box in the embodiment depicted in FIG. 1;

FIG. 3 presents a perspective view of the chipper of the embodiment depicted in FIG. 1;

FIG. 4 presents a rear view of embodiments of the vehicle and dump box depicted in FIG. 1;

FIGS. 5A-B present a cross-section view of embodiments of a dump box.

Figure 6:
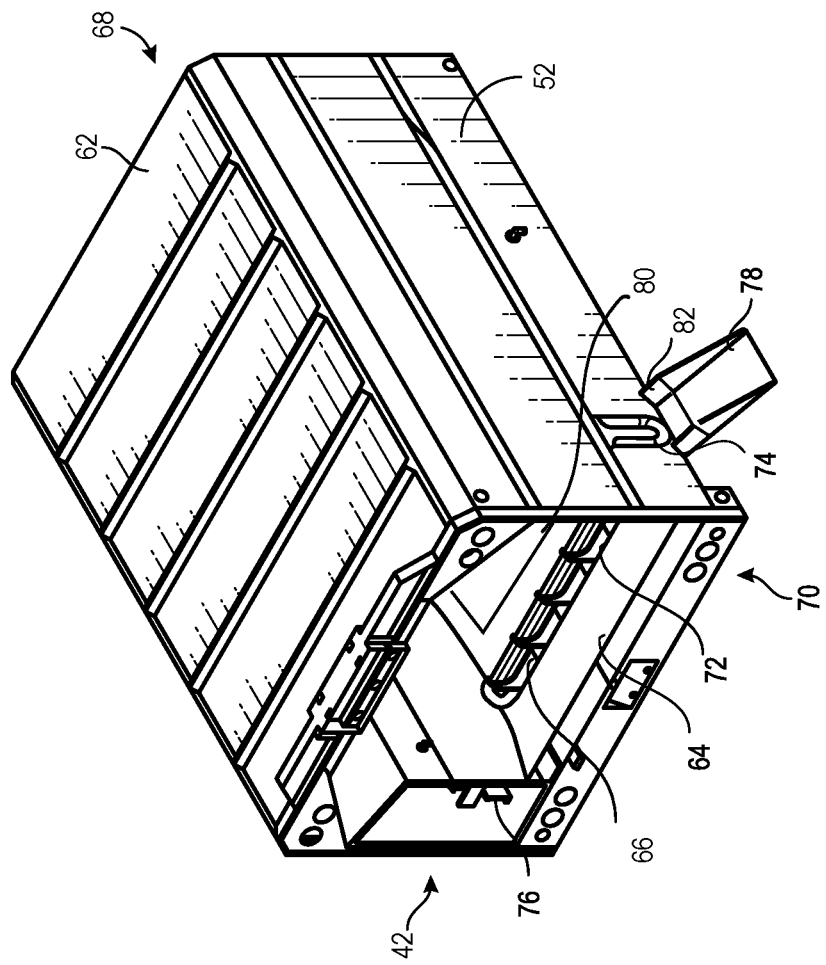
Figure 7:
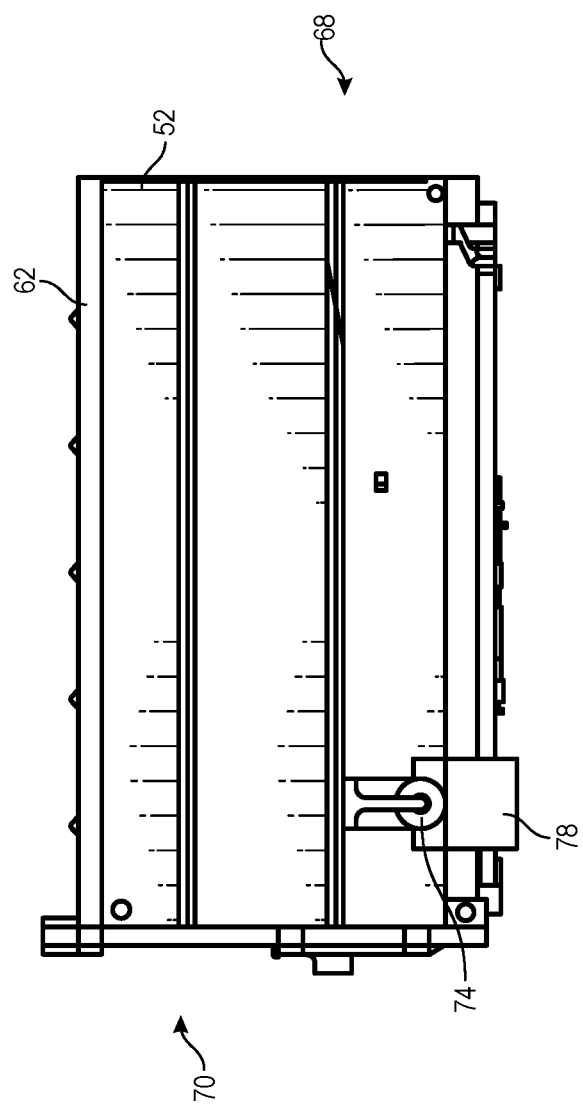
Figure 8:
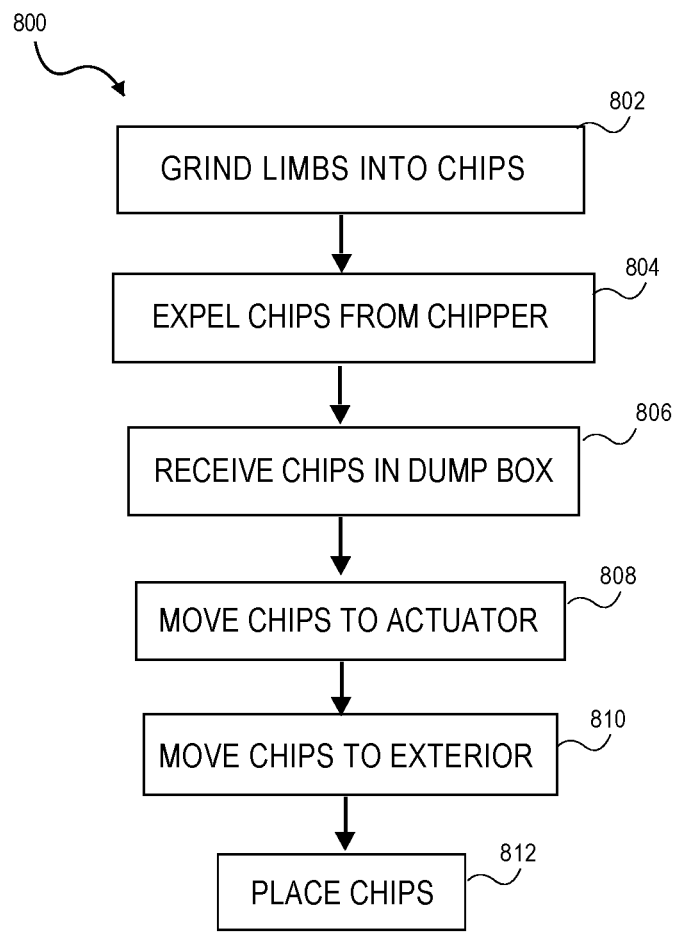

FIG. 6 presents a perspective view of the embodiment of the dump box depicted in FIGS. 5A-B;

FIG. 7 depicts a side view of the embodiment of the dump box presented in FIGS. 5A-B; and FIG. 8 depicts a method that may be used in embodiments of a dump box.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

In general, a dump box may be used to catch, store, and distribute material. Typically, and in examples used herein, the dump box may be used to catch chips such as wood chips from a wood chipper, or chipper. The wood chips may be stored in the dump box until such time that the dump box may be operated. In typical dump boxes the dump box is rotated in a tilting motion and the contents are dumped on the ground. This raises many time and safety issues as described above. The dump box, in embodiments of the instant invention, solves these problems by utilizing an auger to move the wood chips from the interior of the dump box to the exterior thus negating the need to tilt the dump box. The auger may be located on, in, or near the floor of the dump box and may comprise a screw-like shape thus moving the chips by rotating. The chips may exit the dump box through a sidewall opening and be placed in a location exterior the dump box by a telescopic and moveable chute. The dump box may be configured with a rotating belt or a vibrating floor to aid the chips in moving along a floor toward the auger.

Turning now to FIG. 1 depicting an embodiment of a typical arrangement of a dump box 10 mounted on a vehicle 12. The vehicle 12 may be towing a chipper 14 attached at a hitch 16. The vehicle 12 may be a utility truck as depicted or may be a standard truck, car, or any vehicle that may be capable of towing the chipper 14 and carrying the dump box 10. In some embodiments, there may be no vehicle 12 and the dump box 10 may be on a trailer and operate while the vehicle 12 tows the trailer or no vehicle 12 is attached. Additionally, the dump box 10 may operate with no chipper 14. For example, the dump box 10 may be full and expel chips while the chipper 14 is not attached. Any combination of vehicle 12, dump box 10, and chipper 14 may be used.

In some embodiments, the vehicle 12 is a utility truck. The utility truck may be configured with a flat-bed. The truck may have attachments for the dump box 10 or the dump box 10 may rest statically on the truck. The dump box 10 may be supported by the chassis of the truck. The dump box 10 may attach directly to the chassis of the truck using nuts, bolts, screws, chains, any fabric tie downs, winches, or any adhesive or surface area attachments. The dump box 10 may be attached to the truck on a bottom, a top, or any sides. The dump box 10 may also have attachments as described above or be configured with hoops, loops, latches or any other structure that may be used as an attachment or for supporting attachments. In some embodiments, the truck has a hitch and pulls the dump box 10 that may rest on a trailer or have wheels.

In an exemplary scenario as depicted in FIG. 1 the chipper 14 may grind up tree limbs and turn the tree limbs into wood chips. The wood chips may be expelled from the chipper 14 through the chipper chute 18. The chipper chute 18 may be configured such that the wood chips enter the dump box 10 from an opening that may be on any side or top of the dump box 10. The dump box 10, in embodiments referenced herein, utilizes an opening on a side of the dump box 10 facing the chipper 14. The dump box 10 may expel the chips through a sidewall opening (not shown) that may be on any side of the dump box 10. The dump box 10 may expel the chips while the vehicle 12 is in motion or stationary. The dump box 10 is discussed in much more detail below.

Turning now to an embodiment of the invention depicted in FIG. 2, the dump box 10 may be mounted on the vehicle 12 wherein the vehicle 12 is a flat-bed 20 utility vehicle. The vehicle 12 as depicted is a utility vehicle however the dump box 10 may also be mounted on the flat-bed 20 of any truck or trailer. The dump box 10 may be mounted with screws, bolts, clamps, adhesive, or any other attachments that may sufficiently secure the dump box 10 to the flat-bed 20. The dump box 10 may only rest on the flat-bed 20 and may be held in place through friction with a rough lower surface or rubber covering of the lower surface. The flat-bed 20 may also include plates projecting upward from the sides of the flat-bed 20 sides that may prevent the dump box 10 from sliding over the edge of the flat-bed 20.

Continuing with the embodiment depicted in FIG. 2 the vehicle 12 and the chipper 14 may be attached with hitch 16. The chipper 14 may attach to the vehicle 12 by any hitch 16 that may allow the chipper 14 to rotate freely laterally allowing the chipper 14 and vehicle 16 to turn corners connected without binding. The chipper 14 and the vehicle 12 may be configured and arranged such that the chips expelled from the chipper 12 entering the dump box 10 mounted on the vehicle 12 during all allowable movements of the chipper 14 and the vehicle 12. For example, the vehicle 10 and chipper 14 may be moving slowly while in operation. Alternatively, the vehicle 12 and the chipper 14 may be stationary but set at an angle such that the chipper 14 and the vehicle 12 are not aligned. This may be done such that chips may be expelled from the dump box 10 in a location suitable for the chips to be dumped such as a garden, around trees, or in a designated dumping location. The chipper 14 and the vehicle 12 may always be in a position relative to one another such that the chips expelled from the chipper 14 land in the dump box 10.

Turning to FIG. 3, embodiments of the invention relate to receiving chips from chippers for chipping or cutting fibrous material, such as wood and brush. The chipper 14 broadly comprises a frame 22, a feed inlet 24 for receipt of material to be chipped, a material outlet 26 through which chipped material exits, and a chipping mechanism 28 disposed between the feed inlet and the material outlet and mounted on the frame 22. The material may be fed through a feeding system within the chipper 14 that feeds the material to the chipping mechanism 28. The chipper may be powered by a power source 30 for driving the chipping mechanism 28. The chipper 14 presents a feed inlet end 32 and a material outlet end 34. The feed inlet end 32 is positioned proximate the feed inlet 24, and the material outlet end 34 is located at the material outlet 26 which is attached to the chipper chute 18 such that material is fed from a feed inlet end 32 of the chipper 14 and exits towards a material outlet end 34 of the chipper 14.

Continuing with the embodiment depicted in FIG. 3, the frame 22 provides a support for other components of the chipper 14. In particular, the feed inlet 24, material outlet 26, power source 30, chipping mechanism 28, and feed system are mounted on the frame 22. In embodiments, the frame 22 is made of metal or other rigid material configured to withstand the weight of the mounted components. The frame 22 may be formed of welded materials and may have wheels 36 mounted on a bottom of the frame 22 to provide for the frame 22, and thus, the chipper 14, to be towed using hitch 16 or otherwise transportable.

Referring to FIG. 3, the feed inlet 24 comprises a feed horn 38. The feed horn 38 guides or channels the material into the feed system and serves as a guard to prevent items not to be chipped from being caught by the feed system. The feed horn 38 may be made of sheet metal or suitable material and includes four adjoining sides that are angled outwards towards the feed inlet end 32 to present an opening through which the material may be fed.

The chipper 14, as depicted, is attached to the vehicle 12 by the hitch 16 but may attach to the vehicle 12 by any hitch 16 that may allow the chipper 14 to rotate freely laterally allowing the chipper 14 and vehicle 12 to turn corners without binding. As the material, in this scenario tree limbs, is fed into the feed inlet 24 the limbs are ground into chips and expelled through the chipper boom 40 and chipper chute 18. The chipper boom 40 may be rotatable. As depicted in FIG. 3 the chipper boom 40 may be moved into a position away from the dump box 10 to allow the operator access to the dump box 10. The chipper boom 40 may also be pointed toward the dump box 10 allowing the expelled chips to enter the dump box 10.

Turning now to FIG. 4, the dump box 10 may be open on top or covered and the chipper boom 40 may be configured to expel chips into the dump box 10 in either covered or open configurations. In the embodiment depicted in FIG. 4, the dump box opening 42 is open on a side facing the towed chipper 14. In some embodiments, the chipper boom 40 may be angled up down and side to side to expel the chips in a way that covers the entire interior of the dump box 10 through the dump box opening 42. The chipper boom 40 may be moved manually by the operator or automatically and may be moved by human force or by an electric, hydraulic, pneumatic, or gas powered motor. The source of power moving the chipper boom 40 may be the power source 30 or any other power source such as a battery, solar power, wired electrical, or power from the vehicle 12.

The dump box 10 may receive the chips from the chipper chute 18 via the dump box opening 42. The chips may be spread across the floor of the dump box 10 by the chipper boom 40 movement or may be delivered into one location. The chips may be stored in the dump box 10 until time to expel or the chips may be expelled continuously while the chips are received from the chipper 14.

Continuing with the exemplary embodiment depicted in FIG. 4 of the vehicle 12 with the dump box 10 attached, the dump box 10 may present dump box opening 42 to receive the chips. As depicted a vertical wall 44 with structural ribs 46 can be seen through the opening. The vertical wall 44 may comprise structural ribs 46 if necessary, and alternatively, may not. The vertical wall 44 may be located proximate the vehicle 12 and be visible through the dump box opening 42. A lower wall 48 may cross between, as viewed, left sidewall 50 and right sidewall 52. The lower wall 48 may cross below the dump box opening 42 and may aid in containing the chips inside the dump box 10. The lower wall 48 may be a gate and may open for easy access to the interior of the dump box 10. The gate may comprise hinges proximate either the left sidewall 50 or the right sidewall 52 or bottom allowing the gate to fold down or open to either side. In some embodiments, the lower wall 48 may also be in a channel and open in a sliding fashion. In some embodiments, lower wall 48 may extend from the floor to any height including to the top of the dump box 10. In some embodiments, the dump box opening 42 may be located on a different side or on the top of the dump box 10.

The dump box 10 may present lights 54 that may be connected to the lighting system of the vehicle 12. The lights 54 may be configured to display the operating state of the vehicle 12. For example, the dump box 10 may display flashing lights indicative of a hazard when the vehicle lighting system hazard lights are engaged. The dump box 10 may display brakes lights when the brakes on the vehicle 12 are engaged or any of the lighting signals that may be associated with the vehicle lighting system may be communicated and activated via the dump box lighting system and displayed via the lights 54.

In some embodiments, the lights 54 may be separate from the vehicle 12 and may be powered by an independent power source on the dump box 10. The lights 54 may be controlled with a control system on the dump box 10 or may be controlled remotely via a receiver on the dump box 10. The lights 54 may be powered by any power system on the dump box 10 described herein.

The dump box 10 as depicted in the exemplary embodiment in FIG. 4 may include storage compartments 56 for storage and for accessing motors and electrical equipment for running the mechanical and electrical features of the dump box 10. The storage compartments 56, as depicted in FIG. 4, are located on the lower wall 48 but in some embodiments may be located on any dump box 10 wall or interior the dump box 10. The storage compartments 56 may store any items that may be useful to the operators such as equipment or may contain parts or provide access to the power equipment of the dump box 10. For example, the storage compartments 56 may house an electric motor for operating the auger, a conveyor belt, or a vibrating floor of the dump box 10. The storage compartments 56 may also provide access to electrical, mechanical, batteries, electrical outlets, or pneumatic devices for use or maintenance.

Turning now to an embodiment depicted in FIGS. 5A-B presenting a top view and a cross-section view of the dump box 10. In the embodiment, the dump box 10 comprises four sides 60, a top 62, and a floor 64. The sides 60 may be vertical or angled (non-level) and may only partially extend from the floor 64 to the top 62 or from one side 58 to the next. The sides 60 may be of different height. For example, a side near the chipper 14 may be lower than another side to allow the chips 58 to be received by the dump box 10 through the dump box opening 42 easily. In some embodiments, the side near the chipper 14 may be a door, or gate, as described above, and the dump box 10 may comprise three vertical or angled sides or there may be no side near the chipper 14 as depicted in FIG. 6. Continuing with the embodiment depicted in 5, the sides 60 may retain the chips such that the chips 58 do not fall out of the dump box 10 up to a specified level. The sides 60 may also be angled such that the chips 58 are funneled into a specific location of the floor 64 of the dump box 10. This may aid in the removal of the chips 58 by forcing the chips 58 to an auger 66 location.

The top 62 of the dump box 10 may be flat or angled. The top 62 may be cone or dome shaped to create greater interior volume for the dump box 10. The top 62 may be removable for large amounts of chips 58 and for easy access for maintenance and cleaning. The top 62 may extend the entire length from the front portion 68 of the dump box 10 to the rear portion 70 or may extend partially. The partial distance may allow the chips 58 to be received more easily and the operator to have better access to the interior without removing the top 62. In some embodiments, the top 62 may be connected with hinges for opening or rollers for rolling the top 62 to a side exposing the dump box 10 interior.

Turning now to the embodiment depicted in FIG. 6, the floor 64 of the dump box 10 may be at an angle relative to the top 62 of the dump box 10. The floor 64 may be metal, composite, or any other material that may support the weight of the chips 58 and provide a smooth surface for allowing the chips 58 to slide or bounce to the location of the auger 66 on the floor 64 for chip 58 removal. The floor 64 may be angled from a high front portion 68 (near the vehicle) to a low position at the rear portion 70 (near the chipper). This may allow the chips 58 to slide into the auger 66. Alternatively, the floor 64 of the dump box 10 may be angled from a high rear portion 70 to a low front portion 68 in embodiments where the auger 66 may be located in the front portion 68 of the dump box 10.

The floor 64 of the dump box 10 may also be curved to channel the chips 58 to the auger 66. The curve may be lower in the center of the floor 64 with the lowest point at a channel 72 that houses the auger 66. The width of the floor 64 of the dump box 10 may also vary. For example, the floor 64 near the front portion 68 may be wider than the floor 64 near the rear portion 70 where the auger 66 may be located. This may allow more chips 58 to be housed within the dump box 10 while having an auger 66 that is not as long as the widest portion of the dump box 10.

The chips 58 may exit the dump box 10 through the sidewall opening 74 when the auger 66 is powered by a motor 76. On the exterior of the dump box 10 at the sidewall opening 74 a chute 78 may direct the chips 58 to a location on the ground to be placed.

In one embodiment best depicted in FIG. 6, the floor 64 is configured to vibrate. The vibration further causes the chips 58 to move to the lowest portion of the floor 64. The auger 66 may be located at the lowest portion of the floor 64. In this way, the floor 64 vibration aids in removal of the chips 58 from the dump box 10. In some embodiments, the vibration may be operated manually or automatically when a weight is sensed such as when the weight of the chips 58 reaches a certain threshold. The vibration may also be automatically halted when the weight of the operator is sensed.

In one embodiment, the vibration may be performed utilizing hydraulic actuators. The floor 64 may be supported by the actuators and when the actuators are engaged the actuators move back and forth vibrating the floor 64 up and down. In some embodiments, the floor 64 may be supported by rollers and the actuators may move the floor side to side. Rollers may also be held between the floor 64 and the sidewall 52 to allow the floor 64 to move up and down without contacting the sidewall 52.

In a second embodiment, the floor 64 may be attached to a weight that is moved by actuators and the weight causes the floor to vibrate. The floor 64 may be vibrated by any method that may cause the floor 64 to move and the chips 58 to move toward the auger 66.

The floor 64 may also comprise a conveyer belt 80. The conveyer belt 80 may continually move the chips 58 along the floor 64 to the auger 66. The conveyer belt 80 may be operated manually or automatically run when a weight is sensed such as when the weight of the chips 58 reaches a certain threshold. The conveyer belt 80 may be configured to be house on or within the floor 64 and may be detachable such that the dump box 10 may be operable with or without the conveyer belt 80.

The auger 66 may be located in the lowest portion of the dump box 10. This may be the rear position 70 as depicted in FIG. 5A, or may be the center portion, or the front portion 68. The auger 66 may be located in the portion of the dump box 10 that allows the best opportunity for removal of the most amount of chips 58. The location that provides the best opportunity for the removal of the most amount of chips 58 may be at the lowest point on the floor 64. The auger 66 may extend from one sidewall to another sidewall and may extend beyond one sidewall. The auger 66 may extend a length proportional to the width of the floor 64 extending to one sidewall or neither sidewall.

The auger 66 may be a round screw-shaped shaft that rotates. The rotation may cause any material, such as chips 58, to move longitudinally along the length of the auger 66. The auger 66 may be placed in the floor 64 of the dump box such that the chips 58 move laterally across the floor as depicted in FIGS. 6 and 7. The chips 58 may move along the length of the auger 66 from a first end to a second end, the second end being proximate a sidewall opening 74. The chips 58 may be removed from the interior of the dump box 10 via the sidewall opening 74.

The auger 66 may have flights extending from a central shaft. The flights may extend a distance sufficient to move the chips 58 toward the sidewall opening 74. The chips 58 may be of different sizes and shapes such that the auger 66 flight length may be variable or may be constant. Additionally, the auger 66 flights may have a certain pitch or angle to the central shaft that moves the chips 58 at a rate toward the sidewall opening 74. The pitch may vary or may be constant along the length of the shaft. The rate may be varied by supplying more or less power to the auger 66 and may be adjustable by the operator or automatically by sensors and controls.

The auger 66 may be easily removable from the dump box 10 for cleaning and maintenance. Chips 58 and material particles or debris may build up over time and the auger 66 and the channel 72 may need to be cleaned or, in the case of damage, repaired. The auger 66 may be easily removable as it may be attached with nuts, bolts, screws, clamps, or any other attachment.

The auger 66 may be powered by a motor 76. The motor 76 may be hydraulic, electric, or gas-powered. The auger 66 may be powered from the vehicle 12 power or an external power source such as battery power or connected directly to an electrical grid. The motor 76 may be located separately from the chips 58 in an enclosure separating the motor 76 from debris and small materials that may damage the motor 76.

The motor 76 may be contained within the sides 60 of the dump box 10 or may be mounted to the outside of the dump box 10 thus creating more room for chips 58. The sides 60 may have an opening through which a driveshaft may run to operate the auger 66.

In embodiments of the invention, the dump box floor 64 presents the channel 72. The auger 66 is disposed at least partially within the channel 72. The channel 72 may prevent chips 58 from being pushed out to the side of the auger 66 when the auger 66 is rotating, thus transporting the chips 58 longitudinally along the length of the auger 66 toward the sidewall opening 74. The channel 72 may extend the length of the auger 66 or may be longer. The channel 66 may be shaped in an arch and may have a radius proportionally larger than the radius of the auger 66 shaft and/or flights. The depth of the channel 72 may also be proportional to the radius of the channel 72 from 0-100 percent. In embodiments, the depth of the channel may be 50% of the radius or less. In some embodiments, the auger 66 may also be located above or in the floor 64 outside of the channel 72 or there may be no channel 72.

The channel 72 may have a lip at the edge where the channel 72 and floor 64 meet. The lip may extend along the floor 64 toward the auger 66 over the channel 72 or the lip may extend vertically tangent to the channel 72. The lip may prevent chips 58 from rotating out of the channel 72 and away from the auger 66. The lip may also prevent chips 58 from entering the channel 72 so there may be sections along the channel 72 that includes no lip.

The auger 66 may move chips 58 through the channel 72 to the sidewall opening 74. The sidewall opening 74 may be configured to expel the chips 58 from the dump box 10 interior. The sidewall opening 74 may be located at an end of the auger 66 such that the chips 58 are expelled from the dump box 10 interior by the rotation of the auger 66. The sidewall opening 74 may be round, square, oval, or any other shape that may be useful in chip 58 removal. The sidewall opening 74 size may be smaller than, the same as, or larger than the diameter or cross sectional area of the auger 66 shaft or flights. The sidewall opening 74 may be on either the left sidewall 50, the right sidewall 52, or any other sidewall, or multiple sidewalls such that the auger 66 may be rotated in a forward or reverse direction removing the chips 58 from the dump box 10 interior on any side of the dump box 10. This may provide versatility to the dump box 10 such that the dump box 10 does not need to be rotated to dump on a second side of the dump box 10.

A chute 78 may be attached to the left sidewall 52 proximate the sidewall opening 74. It should be noted that the chute may be located proximate the sidewall opening 74 on any side 60 that the sidewall opening may be located as described above. The chute 78 may be shaped as an arch, partial oval, partial square, partial rectangle, or any other shape that may perform the function of guiding the chips from the sidewall opening 74 to a location exterior the dump box 10. The chute may telescopically extend from an upper chute portion 82.

Turning now to an embodiment depicted in FIG. 7, the chute 78 length may be a few inches causing the chips 58 to fall away from the dump box 10. The chute 78 may be longer and extend near the ground such that the chips 58 may be placed at a particular location exterior the dump box 10. The chute 78 may be telescopically extendable allowing for a range of lengths. This may be advantageous as a pile of chips 58 may grow exterior the dump box 10. The chute 78 may be lengthened periodically while the dump box 10 is in use to avoid chips 58 piling up in one location.

The chute 78 may swivel such that the chips 58 may be placed in a different location without moving the vehicle 12, dump box 10, or chipper 14. This may be advantageous such that work may not have to stop in order to create multiple piles of chips 58 and remove more chips 58 than may be possible if the chute 78 were not movable and the chips 58 pilled in the same location. The movement, or swivel, of the chute 78 may also allow the chips 58 to be spread across a location such as spreading mulch. This may result in both grinding the tree limbs and spreading mulch simultaneously cutting down on labor and time.

In some embodiments, the auger 66 may be easily removed as described above. The power to the auger 66 and the floor vibration or conveyer belt 80 may be automatically disconnected upon detection of the operator or any person in or near the dump box 10. The dump box 10 may implement a sensing system that detects the location of the operator. The location of the operator may determine the mode of operation of the dump box 10. The location of the operator may be determined from proximity sensors such as radio frequency identification transmitters and receivers, Bluetooth, image sensors, motion detectors, or any other system or method that may determine the location of the operator and signal the dump box 10, chipper 14, and vehicle 12 to set a mode of operation.

In some embodiments, the sensors may also be pressure sensors. A pressure sensor detecting pressure on the floor 64 of the dump box 10 may sense when the operator is in the dump box 10 and automatically change states of the dump box 10 to no power, limited power, or may lock any moving parts. The different states of the dump box 10, chipper 14, and vehicle 12 may also be selected manually by mechanical locking mechanisms or electrically through switches. The state of any one piece of equipment such as the dump box 10, chipper 14, and vehicle 12 may also be relayed to the other piece of equipment ensuring that all pieces of equipment are operating in the same mode.

In some embodiments, the dump box 10 may operate while the vehicle 12 is stationary. The dump box 10 may be stationary and dump chips 58 in a single location via the sidewall opening 74. The chute 78 may telescope placing the chips 58 in a single location distant the dump box 10. The sidewall opening 74 may be covered with a bag or box to catch the chips 58 exiting the dump box 10. The sidewall may have hooks, clamps, bolts, nuts, or any other connector for attaching the bag or box.

In some embodiments, the chute 78 may be adjustable to allow the chips 58 to be placed in multiple locations during operation of the dump box 10. The chute 78 may swivel forward and back and up and down. The chute 78 may also rotate making it easier to remove the chips 58. The chute 78 may telescope allowing chips 58 to be placed near or distant the dump box 10. The adjustability of the chute 78 allows chips 58 to be placed at many locations while the dump box 10, chipper 14, and vehicle 12 remain stationary. This operation may decrease the likelihood of injury while allowing the chips 58 to be spread over a large area and allowing the dump box 10 to remain at a single location for a longer time. Spreading the chips 58 over a large area, rather than the chips 58 being dumped when the dump box 10 is full, provides a longer time before the area is full and allows the dump box 10 to remain stationary and operational for longer periods.

In some embodiments, the dump box 10 may operate while the vehicle 12 is in motion. The dump box 10 may have safety features, utilizing the sensors described above, that allow operation while the vehicle 12 is moving such that the dump box 10 is operational while the operator and any objects or pedestrians are in a safe location. The dump box 10 may be utilized to spread chips 58 and mulch over wide areas. This allows the system to perform double duty of grinding branches into chips 58 and spreading the chips 58 across a specified area.

In some embodiments, the dump box 10 may have partitions on the interior creating separate portions of the interior and possibly separating multiple kinds of chips 58. The chips 58 may be spread simultaneously by allowing approximately the same amount of the different kinds of chips 58 to enter the auger 66 at the same time. This allows multiple types of chips 58 to be spread over the specified area.

While various steps of using the dump box have been discussed throughout, a method of using the dump box 10 will now be discussed.

Turning now to FIG. 8 depicting a method used in some embodiments of the invention and referred to general by the numeral 800, at step 802 the chipper grinds, cuts, chews, or utilizes any other method of receiving a limb and making chips. The chipper may run on any of the above-mentioned power sources and may grind any material other than wood that the chipper may be designed for.

At step 804, the chipper expels the chips. The chips may be expelled from a chute that is positioned in a manner consistent with any of the above described embodiments that most easily results in the chips being received by the dump box. Steps 1 and 2 presented above may be performed by the chipper and the steps below may be performed by the dump box.

At step 806, the dump box receives the chips. The chips may be received in an opening on any wall or top of the dump box. The chips may be received cleanly or may be received through a net or filter to block out any larger branches or unwanted material.

At step 808, the chips are moved to a portion of the dump box floor where an actuator is located. The chips may be moved using gravity where the floor is non-level and smooth enough for the chips to slide into a position near the actuator. The chips may be moved using an actuating device such as hydraulics for vibrating the floor or a conveyor belt 80 rotating and moving the chips.

At step 810, the chips are moved to the exterior of the vehicle by an actuator. In embodiments, the actuator may be any device that may move the chips through an opening to the exterior. The actuator may be the auger 66, a conveyor belt, a brush, a plate or any other object that may be used to move the chips from the interior of the dump box to the exterior of the dump box.

At step 812 the chips are placed in a location at the exterior of the dump box. The chips may be placed in a particular location by a chute that, in embodiments, may swivel, rotate, and extend to reach specific locations exterior the dump box.

The steps described above may be performed in any sequence and with any additional steps. Some steps may be removed or added and some steps may be sub-steps of other steps.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A dump box configured to expel chips from an interior of the dump box to an exterior of the dump box, the dump box comprising:
   a plurality of sides and a floor defining the interior of the dump box,
   wherein at least a portion of the floor is non-level so as to present a low point;
   a first opening disposed in the plurality of sides configured for receiving the chips therein;
   a second opening disposed in the plurality of sides configured for expelling the chips therefrom; and
   an actuator disposed at the low point of the floor,
   wherein the actuator expels the chips from the interior of the dump box through the second opening to the exterior of the dump box,
   wherein the actuator is at least partially disposed within a channel,
   wherein the channel is disposed in the floor,
   wherein the second opening is at least partially disposed below the floor.

2. The dump box of claim 1, further comprising a vibration device for vibrating the floor of the dump box to aid in moving the chips to the actuator.

3. The dump box of claim 1, further comprising a belt configured to rotate for moving the chips to the actuator.

4. The dump box of claim 1,
   wherein the channel extends at least a full length of the actuator,
   wherein the actuator comprises an auger.

5. The dump box of claim 1,
   wherein one of the plurality of sides is configured to present the first opening,
   wherein the opening is adjacent a top of the dump box.

6. The dump box of claim 5, wherein the one of the plurality of sides is attached to the dump box with hinges allowing the one of the plurality of sides to pivot on said hinges.

7. The dump box of claim 1, further comprising:
   a chute proximate the second opening,
   wherein the chute is attached to the exterior of the dump box.

8. The dump box of claim 7,
   wherein the chute telescopically extends,
   wherein the chute swivels to distribute the chips across an area.

9. The dump box of claim 1,
   wherein the dump box is configured to be secured to a vehicle,
   wherein the actuator is powered by an electric motor,
   wherein the electric motor is powered by electric power from the vehicle,
   wherein the actuator comprises a shaft and a plate configured to push the chips through the second opening.

10. The dump box of claim 1,
    wherein the actuator is powered by a reciprocating engine,
    wherein the reciprocating engine is mounted within the dump box.

11. A dump box configured to be secured to a vehicle and move chips from an interior of the dump box to an exterior of the dump box, the dump box comprising:
    a plurality of sides and a floor defining the interior of the dump box, wherein at least a portion of the floor is non-level so as to present a low point,
wherein at least one of the plurality of sides or the floor is secured to the vehicle;
a first opening disposed in the plurality of sides configured for receiving the chips therein;
a second opening disposed in the plurality of sides configured for expelling the chips therefrom; and
an actuator disposed at the low point of the floor,
wherein the actuator is at least partially disposed below the floor,
wherein the actuator expels the chips from the interior of the dump box through the second opening to the exterior of the dump box.

12. The dump box of claim 11, wherein the vehicle is configured to tow a chipper which creates and directs the chips into the dump box.

13. The dump box of claim 11, wherein at least one side of the plurality of sides is angled such that a portion of the at least one side proximate the floor is closer to a second side of the plurality of sides than an upper portion of the at least one side distant the floor.

14. The dump box of claim 11,
wherein the low point of the floor is proximate the actuator and the high point of the floor is proximate a side of the plurality of sides,
wherein the actuator comprises a shaft and a plate configured to push the chips through the second opening.

15. The dump box of claim 11, wherein the first opening is on a side adjacent the second opening.

16. The dump box of claim 15,
wherein the actuator is proximate the first opening,
wherein the actuator is at least partially disposed within a channel,
wherein the actuator is an auger.

17. A dump box configured to move chips from an interior of the dump box to an exterior of the dump box, the dump box comprising:
a plurality of sides and a floor defining the interior of the dump box,
wherein at least a portion of the floor is non-level so as to present a low point;
a first opening disposed in the plurality of sides configured for receiving the chips therein;
a second opening disposed in the plurality of sides configured for expelling the chips therefrom; and
an auger disposed at the low point of the floor,
wherein the auger is at least partially disposed in a channel,
wherein the channel is disposed in the floor,
wherein the auger expels the chips from the interior of the dump box through the second opening to the exterior of the dump box.

18. The dump box of claim 17,
further configured to attach to a vehicle,
wherein the auger is at least partially disposed within a channel,
wherein at least one end of the channel is proximate the second opening.

19. The dump box of claim 18,
further comprising a chute proximate the second opening,
wherein the chute may telescopically extend,
wherein the chute may swivel to distribute the chips across an area.

20. The dump box of claim 19,
wherein the second opening is located on a side adjacent the first opening,
wherein the auger is proximate the first opening.

\* \* \* \* \*